US012293863B2

(12) United States Patent
Zhou et al.

(10) Patent No.: US 12,293,863 B2
(45) Date of Patent: May 6, 2025

(54) 220KV TRANSFORMER SLEEVE

(71) Applicant: HUANENG SHANGHAI SHIDONGKOU SECOND POWER PLANT

(72) Inventors: Liren Zhou, Shanghai (CN); Yuqing Sang, Shanghai (CN); Yan Sun, Shanghai (CN); Shuang Hao, Shanghai (CN); Guoping Tong, Shanghai (CN); Zhengrong Li, Shanghai (CN); Jie Lv, Shanghai (CN)

(73) Assignee: HUANENG SHANGHAI SHIDONGKOU SECOND POWER PLANT, Shanghai (CN)

( * ) Notice: Subject to any disclaimer, the term of this patent is extended or adjusted under 35 U.S.C. 154(b) by 641 days.

(21) Appl. No.: 17/711,054

(22) Filed: Apr. 1, 2022

(65) Prior Publication Data

US 2022/0319756 A1 Oct. 6, 2022

(30) Foreign Application Priority Data

Apr. 1, 2021 (CN) ......................... 202110353834.0

(51) Int. Cl.
*H01F 27/02* (2006.01)
*H01F 27/34* (2006.01)

(52) U.S. Cl.
CPC ........... *H01F 27/02* (2013.01); *H01F 27/346* (2013.01); *H01F 2027/348* (2013.01)

(58) Field of Classification Search
CPC .. H01F 27/02; H01F 27/346; H01F 2027/348; H01F 27/04; H01F 27/306; H01F 27/2828; H01F 27/2823
USPC ...................................................... 336/90, 92
See application file for complete search history.

(56) References Cited

U.S. PATENT DOCUMENTS

2022/0319757 A1* 10/2022 Zhou ................... H01F 27/2828

FOREIGN PATENT DOCUMENTS

CN 108550457 A * 9/2018
CN 113012897 A * 6/2021 ............. H01F 27/02

* cited by examiner

*Primary Examiner* — Tuyen T Nguyen
(74) *Attorney, Agent, or Firm* — IDEA Intellectual Limited; Margaret A. Burke; Sam T. Yip

(57) ABSTRACT

The present invention discloses a 220 KV transformer sleeve. The sleeve includes a sleeve assembly and a connecting assembly. The sleeve assembly includes a sleeve brace, an adjustable part coupled with the sleeve brace. The connecting assembly includes a rotating part and a mobile part. The sleeve is secured on the transformer core body through screws, and the adjustable part can be opened through the connecting assembly. When maintenance is required, there is no need to dismantle the entire sleeve. The work efficiency is greatly improved. This minimizes inductance leakage and prevents eddy currents from occurring.

10 Claims, 5 Drawing Sheets

220KV TRANSFORMER SLEEVE

FIELD OF THE INVENTION

The invention relates to the technical field of transformers. In particular, it relates to a 220 KV transformer sleeve.

BACKGROUND OF THE INVENTION

The sleeve on the low-voltage side of a high-voltage transformer contains the outlet of the generator's cables and the outer case of the transformer's connecting point. Taking apart the sleeve during regular upkeep is a complex and difficult process. To perform required maintenance tasks, the sleeve must be removed from the low-voltage side, and the sleeve has to be taken apart and removed from the core structure, which requires a crane to lift the sleeve. During a routine temperature check, the transformer sleeve is placed under different degrees of heat. This transformer sleeve also functions to seal the device. Under constant overheating, the metal part will decay rapidly, and its lifespan is shortened, which ruins the sleeve's ability to seal.

SUMMARY OF THE INVENTION

This section is for the purpose of summarizing some aspects of embodiments of the invention and to briefly introduce some preferred embodiments. In this section, as well as in the abstract and the title of the invention of this application, simplifications or omissions may be made to avoid obscuring the purpose of the section, the abstract and the title, and such simplifications or omissions are not intended to limit the scope of the invention.

The present invention has been made in view of the above-mentioned problems of the difficult process in taking apart the 220 KV transformer sleeve.

In a preferred embodiment of the 220 KV transformer sleeve, the sleeve includes a sleeve assembly, wherein the sleeve assembly includes a sleeve brace and an adjustable part coupled with the sleeve brace, and a connecting assembly, wherein the connecting assembly connects to the sleeve brace and the adjustable part, wherein the connecting assembly includes a rotating part, wherein the rotating part includes a first trajectory plate connecting to the sleeve brace, a first connecting plate disposed on one side of the first trajectory plate, a first connecting cylinder connecting the two first connecting plates, a first gear shaft disposed on one side of the first connecting cylinder, a first connecting shaft connects to the first connecting cylinder, a second connecting shaft connecting to the first gear shaft, a first gear disposed on the first gear shaft, a second gear meshing with the first gear, a second gear shaft coupled with the second gear, wherein the first connecting shaft and the second connecting shaft are connected, and the second gear shaft extends beyond the sleeve brace, wherein the first trajectory plate is formed with a trajectory slot, wherein the first connecting plate has a holding cylinder received by the trajectory slot.

In an embodiment of the 220 KV transformer sleeve, a terminal of the first connecting plate connects to the adjustable part, the trajectory slot includes a straight portion and a round portion, the holding cylinder includes a first cylinder and a second cylinder, the first cylinder and the second cylinder are separated by a distance substantially the same as the radius of the round portion, and a joining point between the straight portion and the round portion is positioned at the middle portion of the straight portion.

In an embodiment of the 220 KV transformer sleeve, the connecting assembly includes a mobile part, the mobile part is coupled to the rotating part from an opposing end, wherein the mobile part includes a second trajectory plate coupled to the sleeve brace, a second connecting plate disposed on one side of the second trajectory plate, a second connecting cylinder connecting the two second connecting plates, a third gear shaft disposed on one side of the second connecting cylinder, a third connecting shaft connecting with the third gear shaft, a third gear disposed on the third gear shaft, a fourth gear meshing with the third gear, and a fourth gear shaft coupled with the fourth gear, wherein one side of the third connecting shaft is attached to the second connecting shaft, the fourth gear shaft extends beyond the sleeve brace, and one terminal of the second connecting plate is coupled with the adjustable part.

In an embodiment of the 220 KV transformer sleeve, the second trajectory plate is formed with a moving slot, the moving slot has an open terminal, the second connecting plate has a third cylinder received by the moving slot, the third cylinder is on a surface plane substantially the same as the second cylinder.

In an embodiment of the 220 KV transformer sleeve, the sleeve brace and the adjustable part is formed with a compartment for receiving the rotating part and the mobile part.

In an embodiment of the 220 KV transformer sleeve, the adjustable part has a sealing protrusion portion, the sleeve brace is formed with a sealing groove which receives the sealing protrusion portion.

In an embodiment of the 220 KV transformer sleeve, the sleeve assembly further includes rubber strips, the inner side of the sleeve brace and the adjustable part is formed with rubber strip grooves disposed at equal intervals for receiving the rubber strips.

In an embodiment of the 220 KV transformer sleeve, the cross-sectional view of the rubber strip is isosceles trapezoid, and the rubber strip tapers towards the center of the sleeve brace and the adjustable part.

In an embodiment of the 220 KV transformer sleeve, the adjustable part has a pull handrail.

In an embodiment of the 220 KV transformer sleeve, wherein the extension terminals of the second gear shaft and the fourth gear shaft that extend beyond the sleeve brace have a screw cap.

The 220 KV transformer sleeve brace can be fixed on the sleeve through the sleeve brace, and the connecting assembly can be adjusted to open up. That is, when a person performs the maintenance work, the sleeve brace does not need to be removed entirely. The work efficiency will be greatly improved. The combination of the rubber strips and the metal sleeve brace greatly reduces the occurrence of leakage inductance and its adverse effect to the sleeve brace. The overheating arising from the eddy current can also be prevented.

BRIEF DESCRIPTION OF THE DRAWINGS

In order to more clearly illustrate the technical solutions of the embodiments of the present invention, the drawings needed to be used in the description of the embodiments will be briefly introduced below. It is obvious that the drawings in the following description are only some embodiments of the present invention, and it is obvious for those skilled in the art to obtain other drawings based on these drawings without inventive exercise, in which.

DETAILED DESCRIPTION OF THE INVENTION

In order to make the aforementioned objects, features and advantages of the present invention comprehensible, embodiments accompanied with figures are described in detail below.

In the following description, numerous specific details are set forth in order to provide a thorough understanding of the present invention, but the present invention may be practiced in other ways than those specifically described and will be readily apparent to those of ordinary skill in the art without departing from the spirit of the present invention, and therefore the present invention is not limited to the specific embodiments disclosed below.

Furthermore, reference herein to "one embodiment" or "an embodiment" means that a particular feature, structure, or characteristic described in connection with the embodiment is included in at least one implementation of the invention. The appearances of the phrase "in one embodiment" in various places in the specification are not necessarily all referring to the same embodiment, nor are separate or alternative embodiments mutually exclusive of other embodiments.

Furthermore, the present invention is described in detail with reference to the drawings, and in the detailed description of the embodiments of the present invention, the cross-sectional view illustrating the structure of the device is not enlarged partially according to the general scale for convenience of illustration, and the drawings are only exemplary and should not be construed as limiting the scope of the present invention. In addition, the three-dimensional dimensions of length, width and depth should be included in the actual fabrication.

EXAMPLES

Example 1

Figure 1:
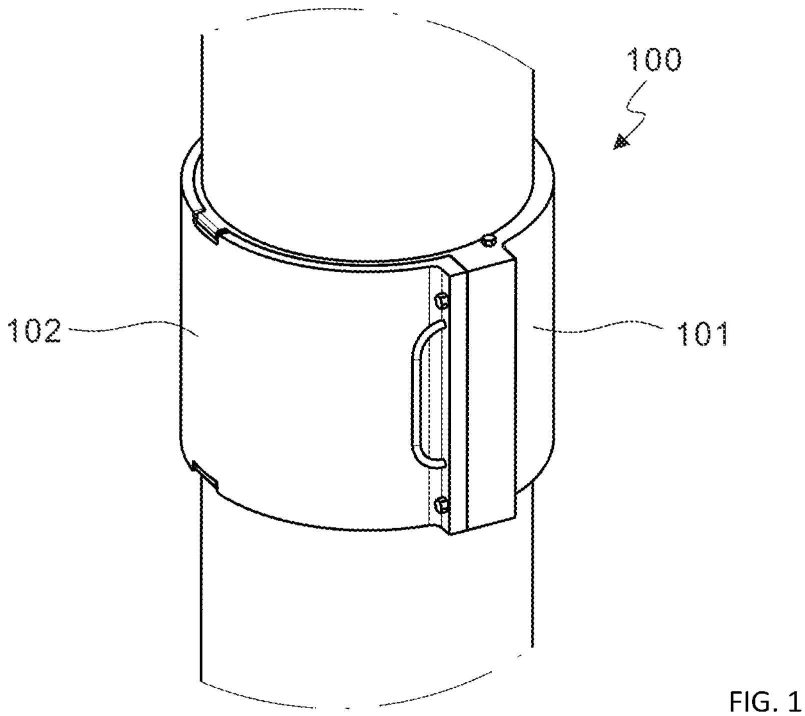
FIG. 1 is a perspective view showing the overall construction of a 220 KV transformer sleeve according to the present invention.
Figure 2:
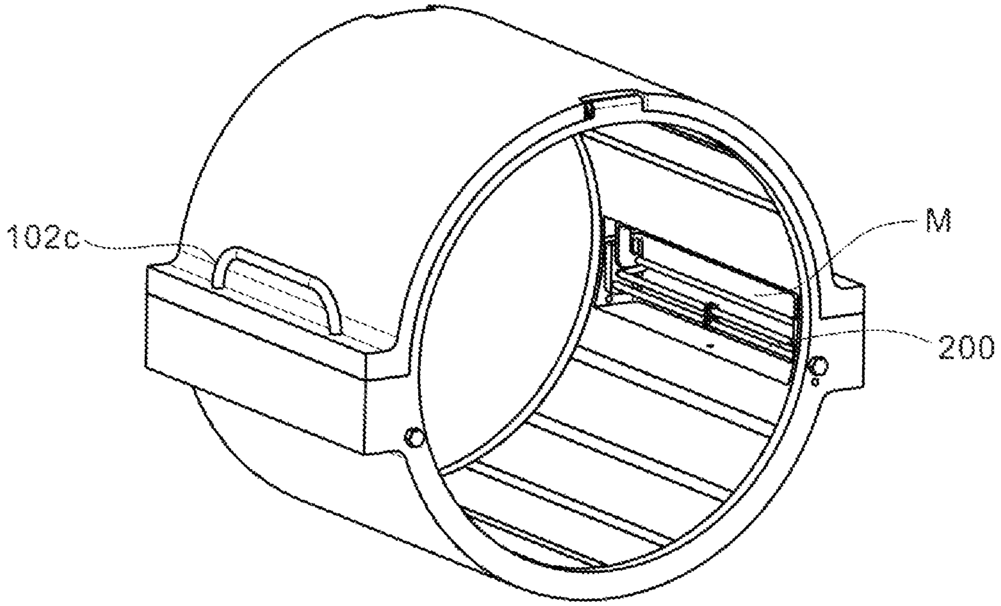
FIG. 2 is a perspective view showing the overall construction of a 220 KV transformer sleeve according to the present invention.
Figure 3:
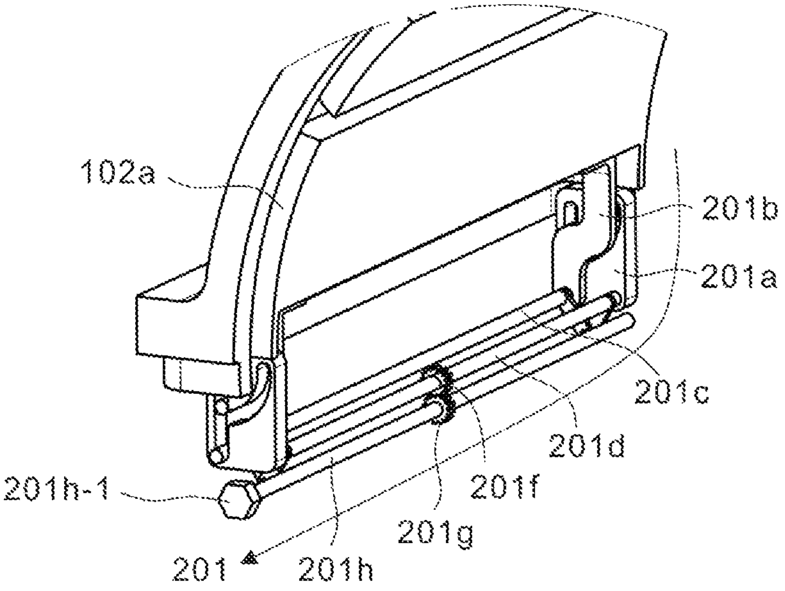
FIG. 3 is a schematic diagram of the rotating part of a 220 KV transformer sleeve according to the present invention.
Figure 4:
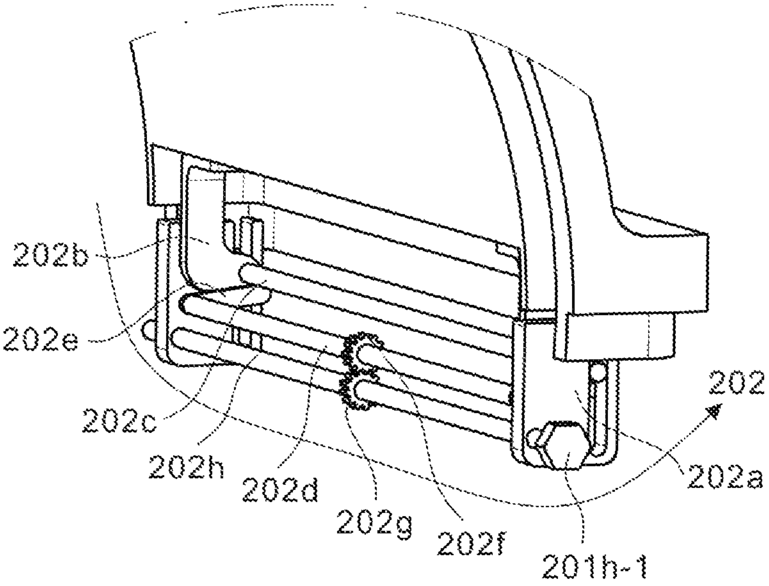
FIG. 4 is a schematic diagram of the mobile part of a 220 KV transformer sleeve according to the present invention.
Figure 5:
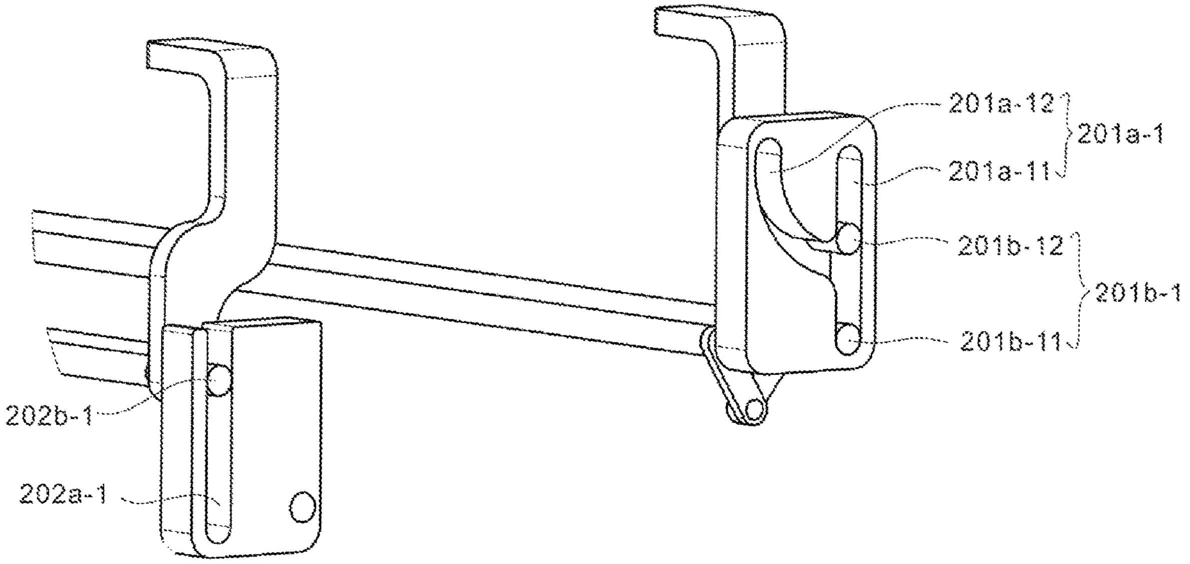
FIG. 5 is a schematic diagram of the trajectory slot and the moving slot of a 220 KV transformer sleeve according to the present invention.
Figure 6:
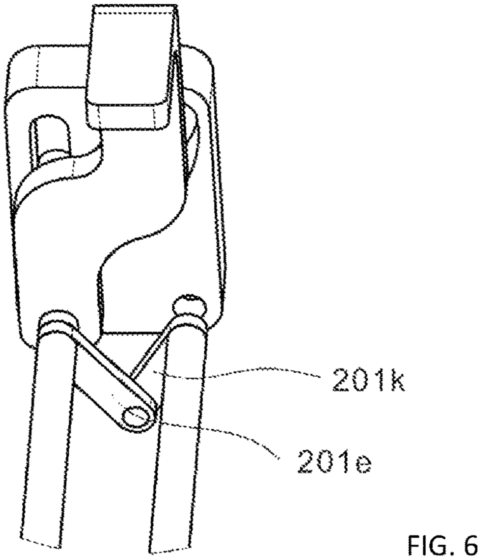
FIG. 6 is a schematic diagram of the first connecting shaft and the second connecting shaft of a 220 KV transformer sleeve according to the present invention.
Figure 7:
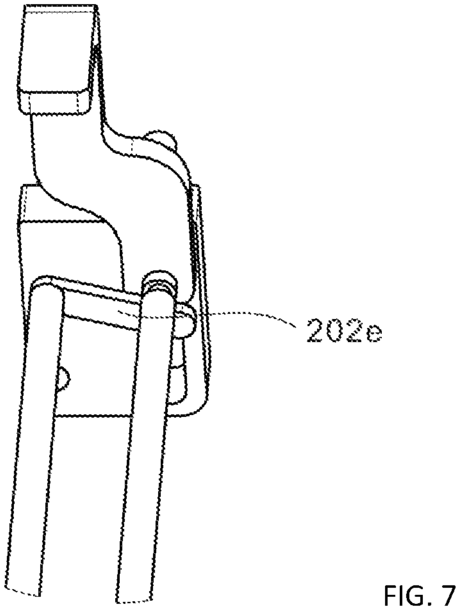
FIG. 7 is a schematic diagram of third connecting shaft of a 220 KV transformer sleeve according to the present invention.
Figure 8:
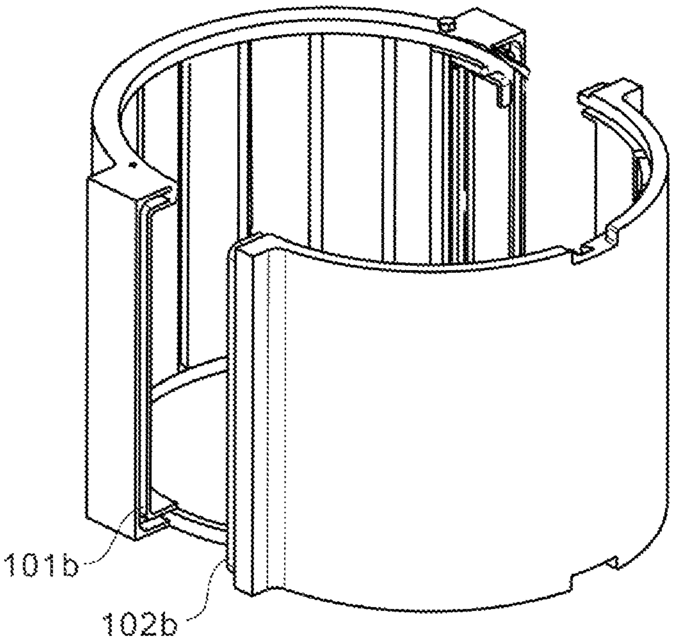
FIG. 8 is a schematic diagram of the adjustable part and the sleeve brace of a 220 KV transformer sleeve according to the present invention.
Figure 9:
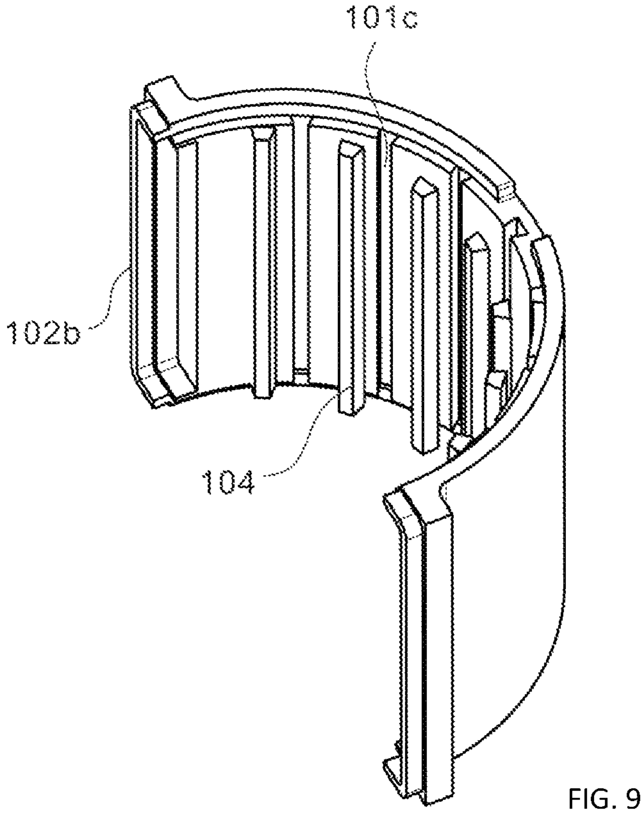
FIG. 9 is a schematic diagram of the rubber strips and rubber strip groove of a 220 KV transformer sleeve according to the present invention.

Please refer to FIGS. 1 and 2. In a first embodiment of the present invention, a 220 KV transformer sleeve is provided.

The 220 KV transformer sleeve includes a sleeve assembly 100 and a connecting assembly 200. By means of the connecting assembly 200, the sleeve assembly 100 can be separated.

More specifically, the sleeve assembly 100 includes a sleeve brace 101 and an adjustable part 102 which is coupled with the sleeve brace 101. It should be noted that the sleeve brace 101 is secured on the transformer core body through screws on the top and bottom end. Alternatively, the screws may go through the sleeve brace 101 for attachment.

The connecting assembly 200 connects to the sleeve brace 101 and the adjustable part 102. The connecting assembly includes a rotating part 201. The rotating part 201 includes a first trajectory plate 201*a* secured on the sleeve brace 1010, a first connecting plate 201*b* disposed on one side of the first trajectory plate 201*a*, a first connecting cylinder 201*c* connecting the two first connecting plates 201*b*, a first gear shaft 201*d* disposed on one side of the first connecting cylinder 201*c*, a first connecting shaft 201*e* secured on the first connecting cylinder 201*c*, a second connecting shaft 201*k* secured on the first gear shaft 201*d*, a first gear 201*f* disposed on the first gear shaft 201*d*, a second gear 201*g* meshed with the first gear 201*f*, and a second gear shaft 201*h* coupled with the second gear 201*g*. The first connecting shaft 201*e* and the second connecting shaft 201*k* are connected through a common bolt. The second gear shaft 201*h* extends out of the sleeve brace 101.

The first trajectory plate 201*a* is formed with a trajectory slot 201*a*-1. The first connecting plate 201*b* has a holding cylinder 201*b*-1 received by the trajectory slot 201*a*-1.

One terminal of the first connecting plate 201*b* is secured on the adjustable part 102. The trajectory plate 201*a*-1 includes a straight portion 201*a*-11 and a round portion 201*a*-12. The holding cylinder 201*b*-1 includes a first cylinder 201*b*-11 and a second cylinder 201*b*-12. The distance between the first cylinder 201*b*-11 and the second cylinder 201*b*-12 is substantially the same as the radius of the round portion 201*a*-12. The round portion 201*a*-12 and the straight portion 201*a*-11 meet at the middle portion of the straight portion 201*a*-11. That is, when the second cylinder 201*b*-12 raises to the top of the straight portion 201*a*-11, the first cylinder 201*b*-11 will move to the entry point of the round portion 201*a*-12.

When the first cylinder 201*b*-11 is at the lowest point of the straight portion 201*a*-11, the angle between the second connecting shaft 201*k* and the first connecting shaft 201*e* is a sharp angle (less than 90°). In an embodiment, the sharp angle is between 10° and 30°. This configuration can lift the first connecting plate 201*b* in a more efficient manner.

In an embodiment, the connecting assembly 200 further includes a mobile part 202. The mobile part 202 is positioned at an opposite end of the rotating part 201. The mobile part 202 includes a second trajectory plate 202*a* coupled to the sleeve brace 101, a second connecting plate 202*b* disposed on one side of the second trajectory plate 202*a*, a second connecting cylinder 202*c* connecting the two second connecting plates 202*b*, a third gear shaft 202*d* disposed on one side of the second connecting cylinder 202*c*, a third connecting shaft 202*e* connected to the third gear shaft 202*d*, a third gear 202*f* disposed on the third gear shaft 202*d*, a fourth gear 202*g* meshed with the third gear 202*f*, and a fourth gear shaft 202*h* coupled with the fourth gear 202*g*. One side of the third connecting shaft 202*e* is attached to the second connecting shaft 202*c*. The fourth gear shaft 202*h* extends beyond the sleeve brace 101, and one terminal of the second connecting plate 202*b* is coupled with the adjustable part 102.

In an embodiment, the second trajectory plate 202*a* is formed with a moving slot 202*a*-1. One terminal of the moving slot 202*a*-1 is open. The second connecting plate 202*b* has a third cylinder 202*b*-1 that is received by the moving slot 202*a*-1.

In an embodiment, the sleeve brace 101 and the adjustable part 102 is formed with a compartment M that receives the rotating part 201 and the mobile part 202.

In an embodiment, the adjustable part 102 has a sealing protrusion portion 102*b*. The sleeve brace 101 is formed with a sealing groove 101*b* which receives the sealing protrusion portion 102*b*.

In an embodiment, the sleeve assembly 100 further includes rubber strips 104. The inner side of the sleeve brace 101 and the adjustable part 102 is formed with rubber strip grooves 101*c* disposed at equal intervals for receiving the rubber strips 104. In an embodiment, an insulating rubber pad is disposed at the mating site of the sealing protrusion portion 102 and the sealing groove 101*b*. In a transformer, inductance may leak at various points. Eddy currents are likely to occur in sleeves made of metal, and the device may overheat. Implementing the rubber strips 104 can effectively prevent eddy currents from occurring.

In an embodiment, the cross-sectional view along the width of the rubber strip 104 is in the shape of an isosceles trapezoid. The rubber strip 104 tapers towards the center of the sleeve brace 101 and the adjustable part 102. This configuration allows quick insertion of the rubber strips 104 into the rubber strip grooves 101*c*.

In an embodiment, the adjustable part 102 has a pull handrail 102*c*. The extended terminals of the second gear shaft 201*h* and the fourth gear shaft 202*h* that extend beyond the sleeve brace 101 have a screw cap 201*h*-1.

It should be noted that when the sleeve brace has not been dismantled for a long period, the adjustable part 102 may be difficult to pull out through the pull handrail 102*c* because of corrosion. The two screw caps 201*h*-1 secured on the terminals of the second gear shaft 201*h* and the fourth gear shaft 202*h* can be loosened, such that the adjustable part 102 can be separated from the sleeve brace 101. When the adjustable part 102 is relaxed, the adjustable part 102*c* can be pulled out through the pull handrail 102*c*.

It should be noted that the sleeve can be opened through loosening the screw caps 201*h*-1 and the adjustable part 102 will open. The adjustable part 102 can also be opened by pulling the pull handrail 102*c*. The advantages of the mobile part 202 include better sealing and easy handling. The sealing protrusion portion 102*b* can mate with the sealing groove 101*b*. The adjustable part 102 can be opened up through the third connecting shaft 202*e*.

The sleeve is secured on the transformer core body through screws on the top and bottom end of the sleeve brace 101. The adjustable part 102 and the sleeve brace 101 are coupled. The sealing protrusion portions 102*b* are inserted to the sealing grooves 101*b* to form a seal. The adjustable part 102 and the sleeve brace 101 can be tightly secured on the transformer core body by driving the screws further down. Screws may be used on the top and bottom ends of the adjustable part 102 to secure the sleeve on the transformer core body. If maintenance is required, the screws should be removed first. Subsequently, pull the pull handrail 102*c*, such that the adjustable part 102 becomes mobile. If the pull handrail 102*c* is locked, loosening the two screw caps 201*h*-1 will make the adjustable part 102 become mobile. Then the adjustable part 102 can be opened up through the pull handrail 102*c*.

It should be noted that the above-mentioned embodiments are only for illustrating the technical solutions of the present invention and not for limiting, and although the present invention has been described in detail with reference to the preferred embodiments, it should be understood by those skilled in the art that modifications or equivalent substitutions may be made on the technical solutions of the present invention without departing from the spirit and scope of the technical solutions of the present invention, which should be covered by the claims of the present invention.

What we claim:

1. A 220 KV transformer sleeve comprising:

a sleeve assembly (100), wherein the sleeve assembly (100) includes a sleeve brace (101) and an adjustable part (102) coupled with the sleeve brace; and a connecting assembly (200), wherein the connecting assembly connects to the sleeve brace (101) and the adjustable part (102), wherein the connecting assembly (200) includes a rotating part (201), wherein the rotating part (201) includes a first trajectory plate (201*a*) connecting to the sleeve brace (101), a first connecting plate (201*b*) disposed on one side of the first trajectory plate (201*a*), a first connecting cylinder (201*c*) connecting the two first connecting plates (201*b*), a first gear shaft (201*d*) disposed on one side of the first connecting cylinder (201*c*), a first connecting shaft (201*e*) connects to the first connecting cylinder (201*c*), a second connecting shaft (201*k*) connecting to the first gear shaft (201*d*), a first gear (201*f*) disposed on the first gear shaft (201*d*), a second gear (201*g*) meshing with the first gear (201*f*), a second gear shaft (201*h*) coupled with the second gear (201*g*), wherein the first connecting shaft (201*e*) and the second connecting shaft (201*k*) are connected, and the second gear shaft (201*h*) extends beyond the sleeve brace (101);

wherein the first trajectory plate (201*a*) is formed with a trajectory slot (201*a*-1), wherein the first connecting plate (201*b*) has a holding cylinder (201*b*-1) received by the trajectory slot (201*a*-1).

2. The 220 KV transformer sleeve of claim 1, wherein a terminal of the first connecting plate (201*b*) connects to the adjustable part (102), the trajectory slot (201*a*-1) includes a straight portion (201*a*-11) and a round portion (201*a*-12), the holding cylinder (201*b*-1) includes a first cylinder (201*b*-11) and a second cylinder (201*b*-12), the first cylinder (201*b*-11) and the second cylinder (201*b*-12) are separated by a distance substantially the same as the radius of the round portion (201*a*-12), and a joining point between the straight portion (201*a*-11) and the round portion (201*a*-12) is positioned at the middle portion of the straight portion (201*a*-11).

3. The 220 KV transformer sleeve of claim 2, wherein the connecting assembly (200) includes a mobile part (202), the mobile part (202) is positioned at an opposite side of the rotating part (201), wherein the mobile part (202) includes a second trajectory plate (202*a*) coupled to the sleeve brace (101), a second connecting plate (202*b*) disposed on one side of the second trajectory plate (202*a*), a second connecting cylinder (202*c*) connecting the two second connecting plates (202*b*), a third gear shaft (202*d*) disposed on one side of the second connecting cylinder (202*c*), a third connecting shaft (202*e*) connecting with the third gear shaft (202*d*), a third gear (202*f*) disposed on the third gear shaft (202*d*), a fourth gear (202*g*) meshing with the third gear (2020, and a fourth gear shaft (202*h*) coupled with the fourth gear (202*g*), wherein one side of the third connecting shaft (202*e*) is attached to the second connecting shaft (202*c*), the fourth gear shaft (202*h*) extends beyond the sleeve brace (101), and one terminal of the second connecting plate (202*b*) is coupled with the adjustable part (102).

4. The 220 KV transformer sleeve of claim 3, wherein the second trajectory plate (202*a*) is formed with a moving slot (202*a*-1), the moving slot (202*a*-1) has an open terminal, the second connecting plate (202*b*) has a third cylinder (202*b*-1) received by the moving slot (202*a*-1), the third cylinder (202*b*-1) is on a surface plane substantially the same as the second cylinder (201*b*-12).

5. The 220 KV transformer sleeve of claim 3, wherein the sleeve brace (101) and the adjustable part (102) is formed with a compartment (M) for receiving the rotating part (201) and the mobile part (202).

6. The 220 KV transformer sleeve of claim 5, wherein the adjustable part (102) has a sealing protrusion portion (102*b*), the sleeve brace (101) is formed with a sealing groove (101*b*) which receives the sealing protrusion portion (102*b*).

7. The 220 KV transformer sleeve of claim 4, wherein the sleeve assembly (100) further includes rubber strips (104), the inner side of the sleeve brace (101) and the adjustable part (102) is formed with rubber strip grooves (101*c*) disposed at equal intervals for receiving the rubber strips (104).

8. The 220 KV transformer sleeve of claim 7, wherein the cross-sectional view along the width of the rubber strip (104) is in a shape of isosceles trapezoid, and the rubber strip (104) tapers towards the center of the sleeve brace (101) and the adjustable part (102).

9. The 220 KV transformer sleeve of claim 8, wherein the adjustable part (102) has a pull handrail (102*c*).

10. The 220 KV transformer sleeve of claim 3, wherein the extended terminals of the second gear shaft (201*h*) and the fourth gear shaft (202*h*) that extend beyond the sleeve brace (101) have a screw cap (201*h*-1).

* * * * *